United States Patent

Hain

[11] 4,313,899
[45] Feb. 2, 1982

[54] PROCESS FOR FORMING LAMINATED PAPERBOARD CONTAINERS

[75] Inventor: Paul Hain, Hamilton, Ohio

[73] Assignee: Champion International Corporation, Stamford, Conn.

[21] Appl. No.: 119,486

[22] Filed: Feb. 7, 1980

[51] Int. Cl.³ .................. B29C 17/03; B31D 5/02; B31F 1/36
[52] U.S. Cl. .................... 264/40.1; 73/73; 162/DIG. 3; 162/DIG. 6; 264/129; 264/134; 264/322; 264/340; 427/8; 427/430.1; 427/434.4; 427/439; 493/8; 493/85; 493/275; 493/329
[58] Field of Search .............. 162/223, 224, DIG. 5, 162/DIG. 6; 427/326, 8, 439; 264/322, 40.1, 109, 129, 134, 320, 340; 73/73–75; 493/3, 8, 37, 85, 275, 328, 329, 59, 162, 110, 210; 28/167, 182; 118/667

[56] References Cited

U.S. PATENT DOCUMENTS

| | | | |
|---|---|---|---|
| 1,617,704 | 2/1927 | Colditz et al. | 427/326 |
| 1,948,314 | 2/1934 | Pratt et al. | 264/134 |
| 1,986,291 | 1/1935 | Schur | 162/DIG. 3 |
| 2,605,855 | 8/1952 | Lenz | 162/223 |
| 2,997,927 | 8/1961 | Carson | 493/162 |
| 3,113,886 | 12/1963 | Kolb | 28/167 |
| 3,318,721 | 5/1967 | Lineburg | 428/342 |
| 3,413,192 | 11/1968 | Beecher | 73/73 |
| 3,671,298 | 6/1972 | Maynard | 427/434.2 |
| 3,675,692 | 7/1972 | Jeans | 264/322 |
| 3,676,295 | 7/1972 | Rice | 162/DIG. 6 |
| 3,932,575 | 1/1976 | Andersson | 264/322 |
| 4,086,316 | 4/1978 | Ahrweiler | 264/128 |
| 4,242,418 | 12/1980 | Kitagawa | 428/511 |

FOREIGN PATENT DOCUMENTS 378115 8/1932 United Kingdom ............... 427/326
480790 3/1973 U.S.S.R. ..................... 162/DIG. 6

OTHER PUBLICATIONS

Whittington, Whittington's Dictionary of Plastics, Technomic, Stamford, Conn. (1975), p. 258.

Primary Examiner—Willard E. Hoag
Attorney, Agent, or Firm—Evelyn M. Sommer

[57] ABSTRACT

Tearing, blistering, delamination and other defects in deep drawn plastic laminated paperboard containers are eliminated by adding controlled amounts of warmed moisture to the paperboard immediately prior to forming thereof. Water is heated to a desired temperature and is applied by in-line processing equipment to the unlaminated side of the paperboard which functions to both soften and paperboard and preheat the laminate. By heating both the male and female parts of a die press employed for forming the preheated, softened laminate into the container, preheating the laminate using warm water prior to forming and, continuously controlling the moisture added to the paperboard, the degree of stress imposed on the plastic layer of the laminate and the resulting defects in the formed container are significantly reduced.

26 Claims, 7 Drawing Figures

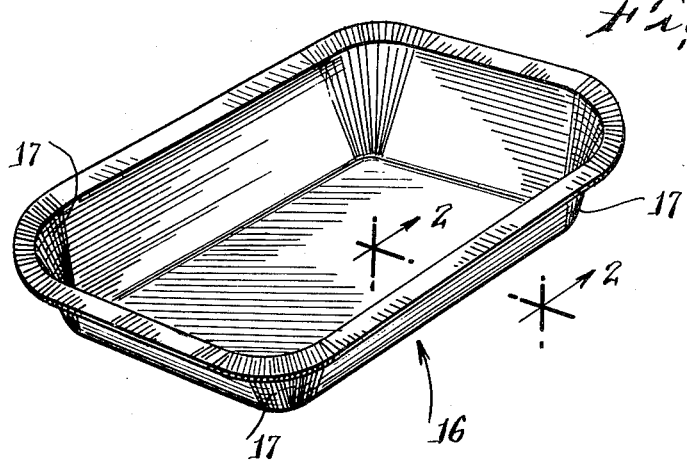
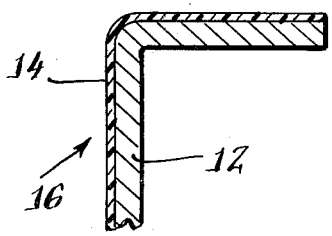
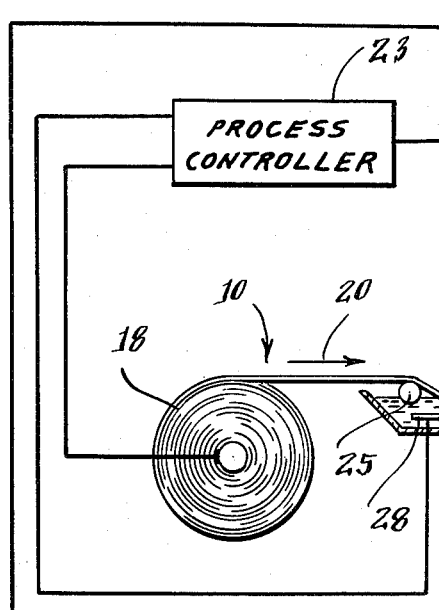
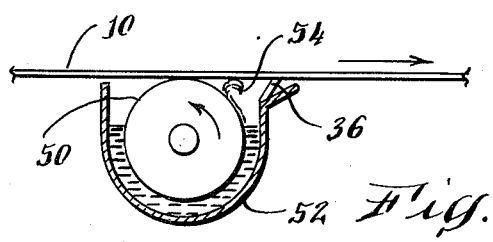
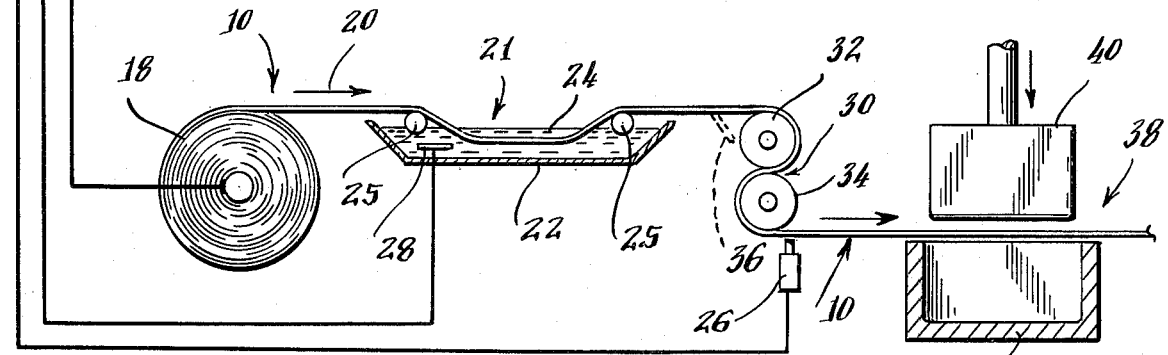
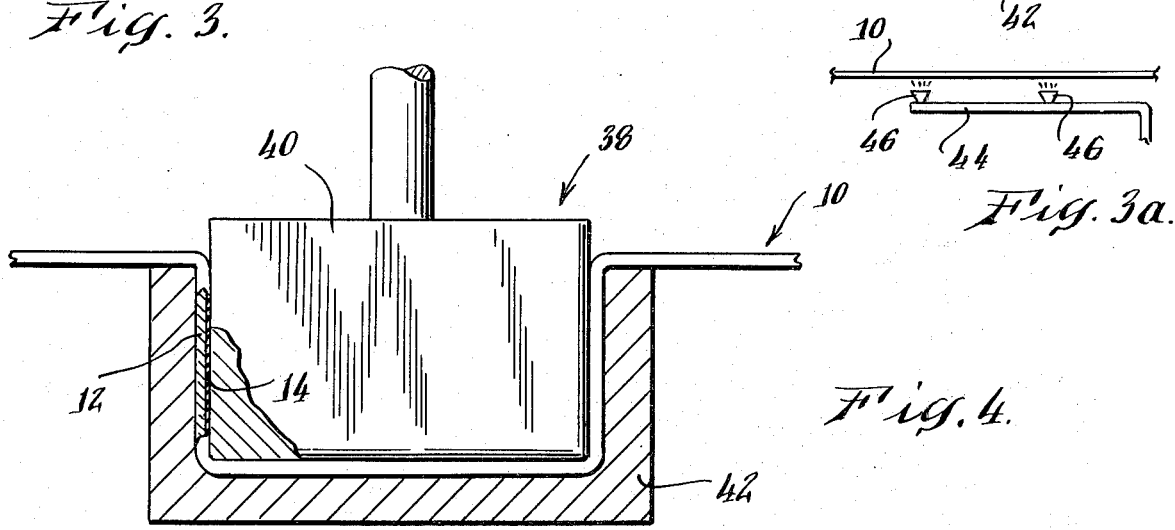

PROCESS FOR FORMING LAMINATED PAPERBOARD CONTAINERS

TECHNICAL FIELD

This invention generally relates to a process for drawing a flexible paperboard laminate having a layer of plastic bonded thereto, into a deep, three dimensional container, and deals more particularly with a process improvement which eliminates tearing, blistering, delamination, and other structural defects in the container which occur during the drawing of the laminate.

BACKGROUND AND BRIEF DESCRIPTION OF THE INVENTION

Numerous processes have been employed in the past for forming sheets of paperboard into unitary, three dimensional container shapes such as those used for holding food products. Typically, molding or pressing apparatus is used to form the paperboard into the desired configuration. It is also known in the art to moisten and thereby soften the paperboard so as to render the same more flexible and thereby facilitate subsequent molding or pressing thereof. U.S. Pat. Nos. 2,997,927 and 3,675,692 are typical of prior art fiber board and paperboard forming processes which recognize the advantage of moistening the sheet stock prior to molding or pressing the same into the desired configuration.

Some container products, such as trays used for packaging food stuffs, benefit from the use of a plastic liner which conforms to the interior of the container and provides a two-way gas and moisture barrier to provide the dual benefits of preventing the paperboard from becoming damaged by the food stuff and preventing the food stuff from drying out or picking up odors from its environment. One method of applying the plastic liner to the container involves vacuum forming the liner into the interior of the container in a separate manufacturing operation after the paperboard container itself has been formed. This approach is undesirable from the standpoint of production economies since separate material handling and manufacturing steps are required. Another approach to manufacturing a lined container of the type described above involves first bonding a layer of plastic film to the sheet of paperboard and then forming the laminate by pressing, molding or drawing the same into the desired configuration.

This last mentioned approach to forming a plastic lined container poses a problem in the case of deep drawn containers, and particularly those made from paperboard stock in that delamination and/or blistering of the plastic film relative to the underlying paperboard frequently takes place. Additionally, the paperboard often undergoes some cracking or splitting upon forming. The physical mechanisms responsible for these defects have not been completely identified, however, it is believed that differences in physical properties of the paperboard and the plastic liner are largely responsible. Such differences include disparities in flexibility and coefficients of thermal expansion. For example, in the case of a laminate wherein the paperboard layer thereof has been pre-moistened prior to forming, the moistened paperboard is quite weak relative to the plastic layer of film; because the plastic film is intimately adhered to the paperboard, stresses imposed on the plastic film during forming are transmitted directly to the underlying paperboard thereby rupturing the latter.

The problems discussed above are exaggerated in the case of containers formed from a laminate of paperboard and plastic film which is deep drawn to a depth 1.375 inches or more because the relative pressures acting on and between the paperboard stock and the plastic film are substantially multiplied; in part, this is because portions of the laminate sheet are folded in order to provide compression of the sheet at the corners of the container. Compression of the laminate sheet at the corners of the container is considerably greater in those which are deep drawn in contrast to more shallow containers.

The known prior art process for forming a deep drawn laminated paperboard container involves an initial step of adding a selected amount of moisture to the paperboard layer of the laminate by immersing the laminate in a liquid bath and then winding the same into a roll; the tension applied to the laminate by the wind-up mechanism may be varied to squeeze excess moisture from the roll, thereby providing rough control of the amount of moisture finally imparted to the laminate. The above described moisture conditioning step is performed at least 24 hours prior to pressing the laminate into containers. The liquid employed in this prior art processing step comprised water at room temperature to which there had been added a wetting agent in the amount of 1 to 1½% by weight. The total amount of moisture imparted to the paperboard was in the range of 6% to 15%. After being preconditioned by the moistening step described above, the laminate was formed in a die wherein the female portion thereof was heated to a temperature of 350°-450° F. and was adapted to contact the paperboard side of the laminate, while the male portion of the die was unheated and contacted the plastic film side of the laminate. The plastic film layer of the laminate was softened during the forming process by heat passing through the paperboard layer originating from the female die.

This prior art process is undesirable in several respects and is believed to be responsible for the various defects, such as delamination and blistering discussed in detail previously. For example, because the process step of applying moisture to the paperboard required an extended length of time to perform, this process step was carried out in a separate operation well in advance of the time that the laminate was actually formed into a container; thus, these separate manufacturing operations carried out at different points in time substantially added to manufacturing costs. Normally, a long length of the laminate was submerged in a relatively large tank filled with the moistening liquid. This necessitated the use of a relatively large tank which displaced valuable manufacturing floor space. Also, the costs associated with the need to add a wetting agent to the moistening liquid were rather substantial, particularly in light of the large quantities of moistening agent which were required to fill the tank. Finally, this prior art approach to premoistening the paperboard provided only rough control, at best, of the amount of moisture imparted to the paperboard, and precluded the possibility of continuous and/or contemporaneous variation of the moisture content of the paperboard immediately prior to forming thereof. The moisture content of the formed container could be controlled to a limited degree by increasing or decreasing the female die temperature in order to alter the amount of moisture in the paperboard which was converted to steam during the forming process, however, the latitude of control was extremely limited and varying the female die temperature had deleterious effects on the physical quality of the resulting container. This problem of controlling moisture in the paperboard was further complicated by the fact that it was necessary to also alter moisture content and the female die temperature to accomodate variations in the physical composition of the laminate.

It is therefore an important object of the present invention to provide an improved process for forming a plastic lined paperboard container which eliminates the problems of delamination or blistering of the liner relative to the paperboard as well as cracking or splitting of the paperboard.

Another object of the invention is to provide an improved process for forming a paperboard and plastic film laminate into a deep drawn container, wherein moisture is added to the paperboard immediately prior to forming thereof in a manner which allows the amount of moisture imparted to the paperboard to be contemporaneously varied to a desired degree.

A further object of the present invention is to provide an improved process as described immediately above which eliminates the necessity of adding moisture to the paperboard using a batch processing technique and allows moisture to be continuously added to the paperboard, as the laminate is delivered to a forming station.

A still further object of the invention, related to the foregoing object, is to eliminate the need for large holding tanks and quantities of moistening liquid, while also eliminating the need for a wetting agent heretofore added to the moistening liquid.

According to the present invention, a sheet laminate is deep drawn by pressing thereof into a three dimensional shape suitable for use as a container. The laminate comprises paperboard or other suitable stock having a layer of plastic, such as polyethylene, polyethylene terephthalate, a polyamide and the like bonded to one side thereof. A continuous sheet of the laminate is drawn in a continuous process from a moistening station where a selected amount of moisture is added to the paperboard substrate, to a forming station where the preconditioned laminate is formed into the container. Coating apparatus at the moistening station applies warm water to the bare (i.e. uncoated) side of the paperboard. The amount of liquid thusly applied may be conveniently altered to control the amount of moisture imparted to the paperboard, and the temperature of the water may be varied in order to preheat the laminate to a desired degree prior to forming thereof. The amount of additional moisture imparted to the laminate is controlled in part by the temperature of the liquid. The moistened, preheated laminate may be score and die cut as desired, and then delivered to a die press wherein the female portion of the die is heated to approximately 250° F. Warming the moistening liquid increases the rate at which the paperboard absorbs the moisture, thereby eliminating the need for a wetting agent. Moisture content of the laminate, die temperatures, container quality, and the moisture content of the formed tray may be continuously monitored, compared and controlled in order to accomodate variations in the physical properties of the laminate. Indicia may be printed onto the laminate either before or after moisture is added thereto.

DESCRIPTION OF THE DRAWINGS

In the drawings, which form an integral part of the specification and are to be read in conjunction therewith, and in which like reference numerals are employed to designate like parts in the various views:

FIG. 1 is a perspective view of a lined paperboard container produced by the improved process of the present invention;

FIG. 2 is a sectional view taken along the line 2—2 in FIG. 1 showing the composition of the laminate;

FIG. 3 is a combined diagramatic and elevational view of an improved process for forming laminated paperboard containers which forms the preferred embodiment of the present invention;

FIG. 3a is a fragmentary, elevational view representing an alternate approach of applying moisture to the paperboard;

FIG. 3b is a fragmentary, sectional side view of another alternate approach of applying moisture to the paperboard;

FIG. 4 is a side view of a heated die press, partially in section; and

DETAILED DESCRIPTION OF THE INVENTION

Figure 5:
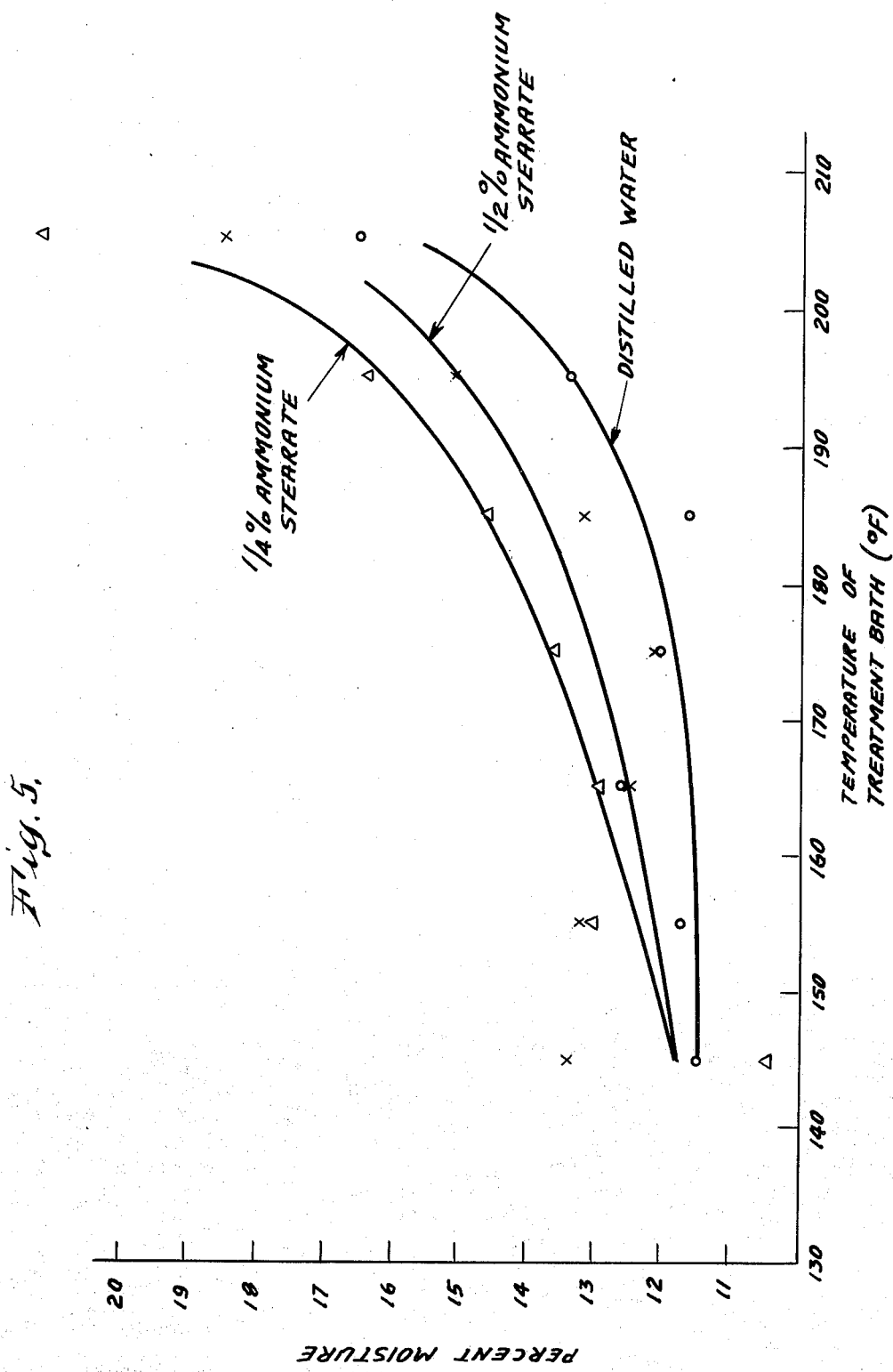
FIG. 5 is a graph illustrating the amount of moisture imparted to the paperboard of the laminate for various solutions at different temperatures.

Referring first to FIGS. 1-3, the present invention involves an improved process for forming a sheet 10 of paperboard material 12 having a layer 14 of plastic bonded to one face thereof into a unitary article, such as the rectangularly shaped, open top tray 16 shown in FIG. 1. The tray 16 is produced in a manner such that the layer 14 of plastic forms the interior surface thereof for the purpose of providing a two-way moisture, oil or grease and gas barrier which both prevents the paperboard material 12 from becoming damaged by the contents of the tray and further prevents the contents from drying out or picking up odors from the environment. The sheet 10 may be scored such that the corners of the finished tray are formed with a plurality of overlapping pleats 17 therein.

The paperboard material 12 may comprise paperstock of the so-called "milk carton" type which possesses the property of being non-browning when subjected to elevated temperatures to allow use of the tray 16 for cooking purposes, as in an oven. "Milk carton paperstock" as used herein is a term well understood in the art and generally comprises bleached virgin sulfate pulp or mixtures thereof which may be coated with clay, if desired. The thickness of such paperstock material is generally at least about 10 points, and preferably, about 15 to 30 points caliper. The basis weight is broadly about 33 lbs/1000 sq. ft. to 100 lbs/1000 sq. ft., and preferably, about 52 lbs/1000 sq. ft. to 180 lbs/100 sq. ft. The tensile strength is 70 to 90 lbs/inch in the machine direction and 40 to 100 lbs/inch in the cross direction. The Taber V-5 stiffness is about 100 to 780 Taber units in the machine direction, and about 50-350 Taber units in the cross direction. All of the above paperboard characteristics are determined by standard tests well known to those in the art.

The plastic layer 14 may comprise any film-forming polymeric materials such as a polyamide, polyethylene, a polyester such as polyethylene terephthalate (PET) and the like applied to the surface of the paperboard material 12 as by extrusion coating. The thickness of the plastic layer will be about ½ mil or more.

One facet of the present invention involves recognition of the fact that the paperboard material 12 may be suitably moisture softened immediately prior to forming thereof in a hot die press in contrast to the prior art technique of conditioning the paperboard material 12 with moisture over a 24 hour period. This is accomplished by drawing off the continuous sheet 10 from a roll 18 thereof in the direction of the arrow 20, and passing the sheet 10 into a treatment bath 21 comprising a relatively shallow pan 22 filled with a heated liquid 24 whereby a short stretch of the sheet 10 is immersed in the liquid 24 for a prescribed time interval. The sheet 10 is continuously drawn through the bath 21 and is delivered into the nip 30 of a pair of press rollers 32 and 34 which squeeze the sheet 10 to remove a desired amount of moisture therefrom. Alternatively, a doctor blade 36, positioned between the bath 21 and rollers 32 and 34 may be employed for removing liquid on the surface of the sheet 10. After the desired amount of excess moisture has been removed from the sheet 10, the treated sheet is delivered into proximity to means for sensing the amount of moisture in the treated sheet 10, such as the moisture scanner 26. Moisture scanner 26 is a commercially available item, whose construction is well known in the art, and may be connected with appropriate process control circuitry 23 (also known in the art) in order to provide a feedback control signal representative of the moisture content of the treated sheet. This control signal may be delivered to means for heating the liquid 24, such as the heating element 28, in order to control the temperature of the liquid 24. The duration of time that the sheet 10 is immersed in the bath 21 may be varied by changing the length of the bath 21. The sheet 10 may then be score and die cut as desired. The sheet 10 then passes on to die press 38 comprising a vertically reciprocable male plunger 40 and a female die 42 internally configured to the exterior shape of the tray 16. The male plunger 40 is sequentially shifted from a raised position as shown in FIG. 3, to lowered position as shown in FIG. 4, in order to form the sheet 10 into the tray 16. Two or more elevationally adjustable fly rolls 25 may be provided adjacent the bath 21 for adjusting the attitude of the sheet 10 within the liquid 24, thereby providing a further means of varying the immersion time of the sheet 10 in the bath 21.

Typically, the sheet 10 is immersed in the bath 21 for a duration of approximately 2 to 6 seconds. The liquid 24 preferably comprises water, which may be distilled if desired, which is heated to a temperature of approximately 140° to 210° F. It has been found that by heating the liquid 24, the ability of the paperboard 12 to pick up moisture is considerably accelerated, thereby permitting the treatment bath 21 to be used in an in-line manner between the roll 18 and the forming apparatus.

In contrast to the prior art which teaches heating the female die 42 to a temperature of 350°–450° F. and using an unheated male die 40, the present invention recognizes that significantly superior results are afforded by reducing the temperature of the female die 42, and heating the male die 40. Preferably, the male plunger 40 is heated to approximately 175°–185° F. while the female die is heated to between approximately 230° F. and 250° F. Substantially improved forming results are obtained by the improved process of the present invention due to several factors. First, reduction of the female die temperature 42 from the higher temperatures employed in the prior art process reduces thermal degradation of the plastic layer 14 from the paperboard 12, while also eliminating the tendency of the plastic layer 14 to crystallize, and further reducing the tendency for ink build-up and off-setting in the female die 42. Secondly, the die temperatures, according to the present invention, are successfully employed to achieve improved quality of the product because heat imparted to the paperboard 12 in the treatment bath 21 is conducted to the plastic layer 14, thereby slightly increasing the plasticity of the same. Moreover, the amount of moisture imparted to the sheet 10 immediately prior to delivery thereof to the die press 38 may be continuously varied to match the physical properties of the sheet 10 to the temperatures employed in the die press 38. Typically, the moisture imparted to the sheet 10 by the bath 21 will be such that the total moisture content of the sheet will be between approximately 8 to 15%. The term "total moisture content" as used herein will be understood to mean the normal amount of moisture inherent in the sheet 10 prior to treatment thereof in the bath 21, plus the amount of moisture added to such sheet by the bath 21.

As indicated before, the liquid 24 preferably comprises water. However, the liquid 24 may also comprise a solution of water to which there has been added approximately ¼ to 1% by volume of a solute which functions as a wetting agent and also lubricates the plastic layer 14. The solute may comprise a fatty acid soap, such as ammonium stearate, red oil or oleic acid, and functions to enhance the ability of the paperboard 12 to pick up moisture. In contrast to the prior art process which demanded the use of a wetting agent to provide sufficient moisture pick up by the paperboard 12, the process of the present invention eliminates the need for a wetting agent altogether, although a wetting agent may be employed as an option if desired. The elimination of the need for a wetting agent substantially increases manufacturing economy in accordance with the present process since the use of a wetting agent is quite expensive, particularly when used in large quantities as was necessary to accomodate immersion of large rolls of the laminate.

The graph of FIG. 5 depicts the amount of increase in the moisture of the paperboard material 12 for various solutions of the liquid 24 at different temperatures. The plots of FIG. 5 respectively represent a liquid comprising distilled water, a solution of distilled water and ¼% ammonium stearate, and a solution of ½% ammonium stearate with distilled water. The paperboard used in connection with tests for generating the data for these plots was immersed in the respective solutions for a period of 6 seconds. As is apparent from these plots, the moisture content of the paperboard material 12 increases as the temperature of the liquid 24 is elevated. Even at a lower range of temperatures (145° F.), distilled water alone increased the moisture content of the paperboard more than 11%. Heating of the distilled water to approximately 205° F. increased the moisture pick up to approximately 16%. The range of 11 to 16% of moisture content is well within the range of moisture conditions required to carry out the improved process of the present invention. The solutions of ¼ and ½% of ammonium stearate and distilled water provided only marginal increases in the amount of moisture pick up at the lower temperatures shown in the plot of FIG. 5, but increased such moisture pick up only about 2 to 3% at the higher temperature ranges. In connection with the preferred form of the present process, however, it has been found that water, without solutes added thereto, provides optimum results when heated to approximately 180°-210° F.

Excessive moisture added to the tray 16 by the bath 21 may result in the formation of mold or bacterial growth thereon and is therefore desirably avoided. A substantial amount of the moisture added to the sheet 10 in accordance with the present invention is incidentally removed when the treated sheet 10 is formed in the die press 38. The heated elements of die press 38 convert a portion of the moisture in the sheet 10 to steam which harmlessly escapes from the die press 38 during the drawing operation. Consequently, the final container 16 contains an amount of moisture which is equivalent to containers manufactured in accordance with the prior art process.

The moisture content in the finished containers is critical. If the content is too high, the containers will be flexible, will not provide the desired shaped and will not nest uniformly. Obviously, the moisture content must be sufficient to achieve satisfactory forming and to then be eliminated in the die by drying therein. The best results are achieved by operating at the lowest moisture level possible to achieve good container formation and to then adjust the die temperature to provide a finished moisture level of about 5 to 6%.

Turning attention now to FIG. 3a, by virtue of the relatively short time required to impart moisture to the paperboard 12, it has been found that the liquid 24 may be applied to the unlaminated, bare side of the paperboard 12 by spray means 44 in lieu of the tray 22 shown in FIG. 3. The term "liquid" as used in connection with FIG. 3a is intended to include both hot water and/or steam. Spray means 44 is disposed beneath the sheet 10 of laminate between the roll 18 and the moisture scanner 26 and comprises one or more nozzles 46 adapted to be coupled with a source of the liquid 24 under pressure and aligned to spray the liquid 24 on the lower, paperboard 12 side of the laminate 10. This approach to imparting moisture to the paperboard 12 possesses the advantage that the plastic layer 14 is not contacted by the liquid 24, thereby avoiding the possibility of contamination of the plastic layer 14 with any releasing agents or lubricants added as solutes to the liquid 24.

An alternate approach to applying the liquid 24 to the unlaminated, bare side of the paperboard 12 is depicted in FIG. 3b wherein the surface of a coating roller 50 disposed beneath the sheet 10 contacts the paperboard 12. The roller 50 is disposed within a trough 52 of the liquid 24 and is adapted to rotate in a counterclockwise direction (as viewed in FIG. 3b) such that liquid 24 carried by the surface of the roller 50 is delivered to the sheet 10, with the excess liquid 24 forming a bank or reservoir 54 on one side of the point of contact between the roller 50 and sheet 10. It should be noted here that the roller may be adapted to rotate in the opposite direction (clockwise as viewed in FIG. 3b) if desired in which case the bank 54 will be formed on the other side of the contact point between the roller 50 and sheet 10. The previously discussed doctor blade 36 may be disposed above the trough 52 in order that the excess liquid 24 removed by the blade 36 is returned to the liquid reservoir within the trough 52.

Controlled tests have been performed comparing the quantity of trays produced in accordance with the process of the present invention with trays produced according to the prior art process previously discussed. These tests and the results thereof are set forth in the following example.

EXAMPLE

In order to demonstrate and evaluate the effects on product quality brought about by the improved process of the present invention, a total of 240 trays were manufactured under various process conditions, including processing in accordance with the prior art conditions and those of the present invention. 24 point board was used for all tests. 10 trays were formed from the board for each of 24 sets of process conditions. Wetting of the laminate was performed by submerging the same for various, predetermined lengths of time in order to provide three sets of laminate sheets respectively possessing moistures of 9%, 12% and 15%. Excess solution was wiped from the surface of the laminates after submersion, and the samples were weighed frequently to check the amount of moisture pick up. One set of the laminate blanks was allowed to sit for 24 hours prior to further processing, while another set thereof were subsequently processed immediately after the moistening step; thus, two moisture equilibrium conditions were employed. After the blanks were moisture conditioned, all samples were scored and die cut, and thereafter pressed at a maximum 10 tons in an approximately two second cycle. The samples were pressed under two die conditions: under the first condition, the female die was heated to 350° F. while the male die was heated to 120° F.; under the second condition, the female die was heated to 250° F. while the male die was heated to 175° F. Thus, one series of sample comprising three moisture levels, two moisture equilibrium conditions and two die temperature conditions were run with plain water being the sole constituent of the liquid used to moisture condition the paperboard. The series of steps outlined above was then repeated but this time a solute comprising 1% of a well known wetting agent (FC 807) was added to the liquid solution and the process was then repeated. 24 sets of control conditions were therefore employed to evaluate processing effects on the trays.

The results of the foregoing tests firmly establishes that the improved process of the present invention yielded tray quality which was equal to or superior to that obtainable with the prior art process. It was found that trays formed from blanks having a 9% moisture content possessed the desirable properties of firmness and stiffness and were superior in terms of reduced wrinkles and overall appearance in comparison to the trays formed from blanks having moisture contents of 12 and 15%. Those trays formed from blanks treated with clean water provided results which were equal to or superior to those trays formed from blanks treated with the solution of water and the wetting agent. With respect to moisture equalization time, there was no perceivable difference in the quality of trays formed from blanks which were processed immediately after moistening and those which were conditioned over a 24 hour period. Trays formed in the die press wherein the female die was heated to 250° F. and the male die was heated to 175° F. proved to be markedly superior to those trays formed under the alternate set of die temperatures; the sides of the tray formed under the optimum die heat conditions were flat with virtually complete elimination of vertical wrinkles and horizontal creping. The scored corners were tight, more uniform and flat, and the bottom flatness and scoring relief were excellent. Several moisture measurements were performed to check the level of moisture of the trays after die pressing thereof and it was found that the moisture values on the finish trays under each set of die temperature conditions was essentially the same.

The trays processed under the optimum die heat conditions were completely free of the following defects which were present in trays formed from blanks pressed with the female die temperature at 350° F. and the male die press at 120° F.: blistering of the plastic layer relative to the paperboard substrate as a result of poor adhesion, particularly in the scored area of the corners of the tray; vertical wrinkles in the sidewalls of the tray attributable to a lack of adhesion and produced during the drawing operation; fine horizontal wrinkling, producing a creping pattern, which was especially evident on the longer sidewalls of the tray; lack of uniformity and flatness of the corners; and, lack of flatness of the bottom and sharpness of the raised patterns in the tray.

From the foregoing, it is apparent that the present invention provides a novel process for eliminating blistering, delamination and other defects in plastic coated paperboard containers during forming operations while at the same time substantially increasing manufacturing efficiency thereof. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. In a process for continuously deep drawing laminated material into a predetermined three-dimensional shape, said laminate comprising paperboard having a layer of plastic bonded to one side thereof, the improvement comprising the steps of:
   heating a liquid to a specified temperature;
   applying the heated liquid to said paperboard to impart moisture to said paperboard prior to deep drawing of said laminate;
   measuring the amount of moisture in a portion of said paperboard after the heated liquid is applied thereto; and
   controlling the amount of moisture imparted to a subsequent portion of said paperboard in response to said measurement, by altering said temperature.

2. The process of claim 1, wherein the applying step is performed immediately prior to deep drawing said laminate.

3. The process of claim 1, wherein said liquid is heated to a temperature in the range of from about 140° F. to about 210° F.

4. The process of claim 1, wherein the applying step is performed by immersing the laminate in a bath of said heated liquid.

5. The process of claim 1, wherein the applying step is performed by delivering said heated liquid to only the unbonded side of said paperboard.

6. The process of claim 1, including the steps of unrolling said laminate from a roll thereof and drawing said laminate in a die press.

7. The process of claim 1, wherein said liquid comprises water as the sole constituent thereof.

8. The process of claim 1, wherein said liquid comprises a solution including a fatty acid soap.

9. The process of claim 1, wherein said layer of plastic is a layer of polyethylene terephthalate.

10. The process of claim 1, wherein the applying step is performed by spraying said liquid to selected areas of said laminate.

11. The process of claim 1, wherein:
    the applying step is performed for a prescribed duration, and
    said duration is altered in accordance with the amount of moisture measured during said measuring step.

12. The process of claim 1, wherein moisture is added to said paperboard until the total moisture content of said paperboard is an amount between 8 and 15% by weight.

13. The process of claim 12 wherein moisture is added to said paperboard in an amount of from 8 to 15% by weight.

14. The process of claim 1, including the step of preheating the layer of plastic prior to deep drawing the laminate.

15. The process of claim 14 wherein the preheating step is performed concurrent with the applying step.

16. The process of claim 1, wherein the applying step is completed in less than 1 hour.

17. The process of claim 16, wherein the applying step is performed in 10 seconds or less.

18. The process of claim 1, wherein the applying step is performed by contacting the unbonded side of said paperboard with a roller having said heated liquid applied to the surface thereof.

19. The process of claim 18, including the step of rotating said roller relative to said sheet of laminate.

20. The process of claim 1, including the step of drawing said laminate in a die press having a heated male die adapted to engage the plastic layer of said laminate and a heated female die adapted to engage the other side of the paperboard.

21. The process of claim 20, wherein the male die is heated to a temperature in the range of 165°–190° F. and the female die is heated to approximately 225°–300° C.

22. The process of claim 20, wherein the female die is heated to a temperature within the range of approximately 230° F. to 250° F.

23. The process of claim 1, wherein said liquid comprises an aqueous solution including a wetting agent as a solute.

24. The process of claim 23 wherein said solute is selected from the group consisting of ammonium stearate, red oil and oleic acid.

25. The process of claim 23, wherein the solute is added to the solution in an amount ranging from about ¼ to 1% by weight.

26. The process of claim 23, wherein said solute comprises ammonium stearate.

* * * * *